United States Patent
Langenbach et al.

(10) Patent No.: US 11,300,087 B2
(45) Date of Patent: Apr. 12, 2022

(54) VALVE, IN PARTICULAR A SUCTION VALVE, IN A HIGH-PRESSURE PUMP OF A FUEL INJECTION SYSTEM

(71) Applicant: Robert Bosch GmbH, Stuttgart (DE)

(72) Inventors: Christian Langenbach, Erbstetten (DE); Francesco Lucarelli, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 254 days.

(21) Appl. No.: 16/063,400

(22) PCT Filed: Oct. 24, 2016

(86) PCT No.: PCT/EP2016/075525
§ 371 (c)(1),
(2) Date: Jun. 18, 2018

(87) PCT Pub. No.: WO2017/102144
PCT Pub. Date: Jun. 22, 2017

(65) Prior Publication Data
US 2019/0003434 A1 Jan. 3, 2019

(30) Foreign Application Priority Data

Dec. 17, 2015 (DE) .......................... 102015225648.0
Mar. 29, 2016 (DE) .......................... 102016205102.4

(51) Int. Cl.
*F02M 59/36* (2006.01)
*F02M 63/00* (2006.01)
*F16K 31/06* (2006.01)

(52) U.S. Cl.
CPC ........ *F02M 59/368* (2013.01); *F02M 63/007* (2013.01); *F02M 63/0021* (2013.01);
(Continued)

(58) Field of Classification Search
CPC .. F02M 63/00; F02M 63/007; F02M 63/0021; F02M 59/36; F02M 59/366;
(Continued)

(56) References Cited

U.S. PATENT DOCUMENTS 4,138,165 A * 2/1979 Blomberg ............. B60T 8/5025
                                                   303/115.2
4,385,339 A * 5/1983 Takada .................... F02D 41/20
                                                   239/585.4
(Continued)

FOREIGN PATENT DOCUMENTS

DE          19639117        3/1998
DE          10320592        11/2004
(Continued)

OTHER PUBLICATIONS

International Search Report for Application No. PCT/EP2016/075525 dated Jan. 16, 2017 (English Translation, 3 pages).

*Primary Examiner* — Matthew W Jellett
*Assistant Examiner* — Christopher D Ballman
(74) *Attorney, Agent, or Firm* — Michael Best & Friedrich LLP

(57) ABSTRACT

A valve including a magnet actuator (22) which has a magnet coil (6), a magnet armature (10) that moves in a stroke-like manner, and a pole core (20), wherein the magnet armature (10) and the pole core (20) together limit a working air gap (28), and the magnet armature (10) can at least indirectly contact the pole core (20), wherein the valve also has a valve element (14) which can be moved between an open position and a closed position, and which is at least indirectly in mechanical contact with the magnet armature (10). A separate magnet armature insert (8) arranged in the magnet armature (10) and/or a separate pole core insert (24) arranged in the pole core (20) is provided in the contact area (Continued)

of the magnet armature (10) on the pole core (20), in order to achieve a separation of the mechanical and magnetic forces.

22 Claims, 5 Drawing Sheets

(52) U.S. Cl.
CPC ............ *F02M 59/36* (2013.01); *F02M 63/00* (2013.01); *F02M 2200/02* (2013.01); *F16K 31/06* (2013.01); *F16K 31/0655* (2013.01); *F16K 31/0658* (2013.01)

(58) Field of Classification Search
CPC ... F02M 59/368; F16K 31/06; F16K 31/0655; F16K 31/0658
See application file for complete search history.

(56) References Cited

U.S. PATENT DOCUMENTS

| | | | | |
|---|---|---|---|---|
| 4,875,742 | A * | 10/1989 | Hawker | B60T 8/363 303/119.3 |
| 5,284,317 | A * | 2/1994 | Brehm | G05D 16/2022 251/129.08 |
| 5,743,238 | A * | 4/1998 | Shorey | F02M 57/02 123/458 |
| 6,213,572 | B1 * | 4/2001 | Linkner, Jr | B60T 8/326 303/113.4 |
| 6,217,001 | B1 * | 4/2001 | Gluchowski | F02M 26/53 251/129.07 |
| 6,439,858 | B1 * | 8/2002 | Kume | F04B 27/1804 417/222.2 |
| 6,679,475 | B2 * | 1/2004 | Rembold | F02M 63/0042 251/129.14 |
| 7,322,373 | B2 * | 1/2008 | Lewis | F02C 9/263 137/516.29 |
| 8,317,157 | B2 * | 11/2012 | Hornby | F16K 31/0655 123/446 |
| 8,616,523 | B2 * | 12/2013 | Duerr | F04B 53/1082 251/129.15 |
| 8,714,179 | B2 * | 5/2014 | Nisinosono | F16K 31/06 137/15.18 |
| 8,714,519 | B2 * | 5/2014 | Voss | B60T 8/363 251/129.15 |
| 8,882,475 | B2 * | 11/2014 | Aritomi | F02M 59/366 123/506 |
| 9,281,114 | B2 * | 3/2016 | Oberle | F02M 63/0019 |
| 9,297,471 | B2 * | 3/2016 | Arikawa | F16K 31/0658 |
| 9,404,457 | B2 * | 8/2016 | Hironobu | F02M 59/366 |
| 9,500,171 | B2 * | 11/2016 | Rickis | F02M 63/004 |
| 9,599,249 | B2 * | 3/2017 | Holmes | F16K 31/0655 |
| 9,777,865 | B2 * | 10/2017 | Bowden | F16K 31/0655 |
| 9,970,399 | B2 * | 5/2018 | Marechal | F02M 63/0022 |
| 2004/0223856 | A1 | 11/2004 | Rembold et al. | |
| 2006/0180783 | A1 * | 8/2006 | Tackes | F16K 3/26 251/129.15 |
| 2008/0203347 | A1 * | 8/2008 | Burrola | F02M 55/04 251/284 |
| 2010/0213758 | A1 * | 8/2010 | Nanahara | B60T 8/363 303/20 |
| 2010/0252763 | A1 * | 10/2010 | Courth | B60T 8/367 251/129.15 |
| 2013/0181149 | A1 * | 7/2013 | Mitsumata | F16K 31/02 251/129.01 |

FOREIGN PATENT DOCUMENTS

| | | |
|---|---|---|
| DE | 102013220593 | 4/2015 |
| DE | 102014200339 | 7/2015 |
| DE | 102014201097 | 7/2015 |
| EP | 1477666 | 11/2004 |
| EP | 1965069 | 9/2008 |
| WO | 03062629 | 7/2003 |
| WO | 2009002629 | 12/2008 |
| WO | 2015110199 | 7/2015 |

* cited by examiner

VALVE, IN PARTICULAR A SUCTION VALVE, IN A HIGH-PRESSURE PUMP OF A FUEL INJECTION SYSTEM

BACKGROUND OF THE INVENTION

The invention relates to a valve, in particular a suction valve, in a high-pressure pump of a fuel injection system, in particular a common rail injection system.

A valve, in particular an electromagnetically controllable suction valve, of a high-pressure pump of a fuel injection system, in particular a common rail injection system, is known from DE 10 2013 220 593 A1. The high-pressure pump having a suction valve of this kind is furthermore known from this document.

The suction valve has a valve element which can be moved between an open position and a closed position, and which is acted upon by the spring force of a first compression spring in the closed position. The valve element is in contact at least indirectly with a magnet armature via an armature pin. By means of the magnet armature, it is thus possible to transmit an actuating force to the valve element. The high-pressure pump has a pump housing having a housing part in which a pump plunger is mounted in a cylinder bore in a manner which allows it to perform a stroke motion, the pump plunger delimiting a pump working space in the cylinder bore. The pump working space can be connected by means of the suction valve to a fuel feed and can be connected by means of a check valve to a high-pressure reservoir. The magnet armature and a pole core are part of an electromagnetic actuator, which furthermore comprises a magnet coil. When the magnet coil is energized, a magnetic field is formed, thereby causing the magnet armature to move relative to the magnet coil against a spring force of a second compression spring in order to close a working air gap between the magnet armature and the pole core.

The high-pressure pump known from DE 10 2014 200 339 A1 for a fuel injection system having a suction valve, in which all the elements described above are surrounded by fuel, has certain disadvantages.

As the working air gap is closed, the magnet armature can strike against the pole core. The impulse force which arises during this process is transmitted to the pump housing in which the suction valve is inserted via components connected to the pump housing. The magnet armature and the pole core are composed of materials which, although having good magnetic properties, do not have a high strength. Since the impulse force can reach high levels as the magnet armature and pole core collide, this can lead to failure of the component joints and/or seals during the life of the valve. This may result in leaks and/or a loss of functioning of the suction valve.

SUMMARY OF THE INVENTION

The valve according to the invention and the pump according to the invention have the advantage over the prior art that a separate magnet armature insert arranged in a magnet armature and/or a separate pole core insert arranged in a pole core is/are provided in the region of contact of the magnet armature with the pole core, via which insert/s the magnet armature comes into contact with the pole core. Through the use, as described in the independent claims, of a magnet armature insert and of a pole core insert, damage to the magnet armature and pole core components is very largely avoided, and the wear resistance of the valve according to the invention and thus of the entire pump according to the invention is increased. A further advantage of the design of the valve according to the invention is that any magnetic adhesion forces which may occur between the pole core and the magnet armature are avoided and thus the reliability of the pump in continuous operation is increased.

It is advantageous that the magnet armature insert is introduced into a first recess in the magnet armature, said recess facing the pole core, and/or in that the pole core insert is introduced into a second recess in the pole core, said recess facing the magnet armature. This makes it possible to optimize the magnetic force of the two components, namely the pole core and the magnet armature, by optimum configuration of the respective surface shape and of the respective surface size. Energy savings in the operation of the pump are thereby possible since the mass of the magnet armature component that has to be moved can be reduced, leading in turn to a cost saving.

Moreover, a further advantage of the design of the valve according to the invention over the prior art consists in that the magnet armature insert has a first collar on the side facing the pole core, said collar projecting in an axial direction from the surface of the magnet armature which faces the pole core and having a first enlarged outside diameter in comparison with the outside diameter of the magnet armature insert in the remaining region thereof. This makes it possible to avoid magnetic adhesion forces between the pole core and the magnet armature and thus to increase the reliability of the valve and of the pump in continuous use.

It is furthermore advantageous that the pole core insert has a second collar on the side facing the magnet armature, said collar projecting in an axial direction from the surface of the pole core which faces the magnet armature and having a second enlarged outside diameter in comparison with the outside diameter of the pole core insert in the remaining region thereof. This makes it possible to avoid magnetic adhesion forces between the pole core and the magnet armature. In addition, there is no need to incorporate surface tolerances that may be required in the region of contact into the relatively complex pole core component by means of surface treatment, it being possible instead to transfer this to the pole core insert component, this in turn reducing the machining time and machining costs. Furthermore, possible damage due to a further machining step on the pole core component, which is more susceptible to such damage owing to its relatively soft magnetic material, is avoided.

Furthermore, a further advantage consists in that the magnet armature insert is embodied in such a way that the magnet armature insert on the one hand projects from the first recess in the magnet armature on the side facing the pole core and, on the side facing away from the pole core, projects beyond the surface of said armature on this side and, in particular, is in contact with the valve element on this side. It is thereby possible to reduce the complexity of the valve and of the pump since the design configuration of the magnet armature insert makes the armature pin component completely obsolete and a simplification thus takes place. As a result, machining and assembly steps are reduced and product costs are thus reduced. As a further advantage there is furthermore the fact that direct contact between the magnet armature and the valve element is prevented by the design configuration of the magnet armature insert component, reducing the possibility of component failure of the magnet armature and thereby increasing the reliability of the valve and of the overall pump.

It is furthermore advantageous that the first collar of the magnet armature insert is supported in an axial direction on a shoulder of the magnet armature—said shoulder being formed circumferentially on the inside diameter of the magnet armature and being referred to below as the first shoulder. By means of this valve design according to the invention, it is possible to prevent the magnet armature insert component from moving into the first recess in the magnet armature, in particular during continuous operation of the pump, which would lead to failure of the pump. It is thereby possible to increase the reliability of the valve and of the overall pump.

It is furthermore advantageous that the second collar of the pole core insert is supported in an axial direction on a second shoulder of the pole core—said shoulder being formed circumferentially on the inside diameter of the pole core. By means of this valve configuration according to the invention, it is possible to prevent the pole core insert component from moving into the second recess in the pole core, in particular during continuous operation of the pump, which would lead to failure of the pump. It is thereby possible to increase the reliability of the valve and of the overall pump.

In addition, it is advantageous that the magnet armature insert and/or the pole core insert is/are composed of a material which has a higher strength than the material of the magnet armature or of the pole core. By means of the configuration according to the invention, damage due to a contact impulse between the magnet armature and pole core components can be prevented, leading to an extension of the life of the pump. Furthermore, it is possible to achieve a reduction in the impact impulse and thus in the damage impulse by selecting damping materials for the magnet armature insert and/or the pole core insert. Through this use of different materials, it is additionally possible to achieve an increase in component stiffness, respectively by the combination of the magnet armature and magnet armature insert and/or the pole core and pole core insert.

Moreover, it is advantageous that the material of the magnet armature insert and/or the material of the pole core insert is/are nonmagnetic. On the one hand, it is thereby possible to avoid the magnetic adhesion forces between the magnet armature and pole core components, which can have a negative effect on the reliability of the pump. Furthermore, it is possible to achieve a reduction in the weight of the component combinations, on the one hand reducing the damaging impulse energy upon contact and, on the other hand, leading to an energy saving in the operation of the pump.

Furthermore, it is advantageous that the second compression spring projects into a third recess in the magnet armature insert and/or into a fourth recess in the pole core insert and, in particular, is guided in the radial and/or axial direction, wherein this second compression spring is arranged between the magnet armature and the pole core. This second compression spring exerts an axial and mutually opposed force on the magnet armature and the pole core. It is thereby possible to reduce damage to the second compression spring, e.g. due to tilting, and thus to extend the life of the overall pump.

Furthermore, further embodiments of the hard pole core inserts and of the hard magnet armature insert can be embodied in such a way that they do not have a profile with two steps but have only a single step, which is then, in turn, in contact either with the pole core or with the magnet armature. This simplifies the manufacture of the pole core, pole core insert, magnet armature and magnet armature insert components since there is no need to allow for any undetermined tolerance situations due to the double step.

BRIEF DESCRIPTION OF THE DRAWINGS

One or more variants of the invention is/are illustrated in the drawing and explained in greater detail in the following description. In the drawing.

DETAILED DESCRIPTION

Figure 1:
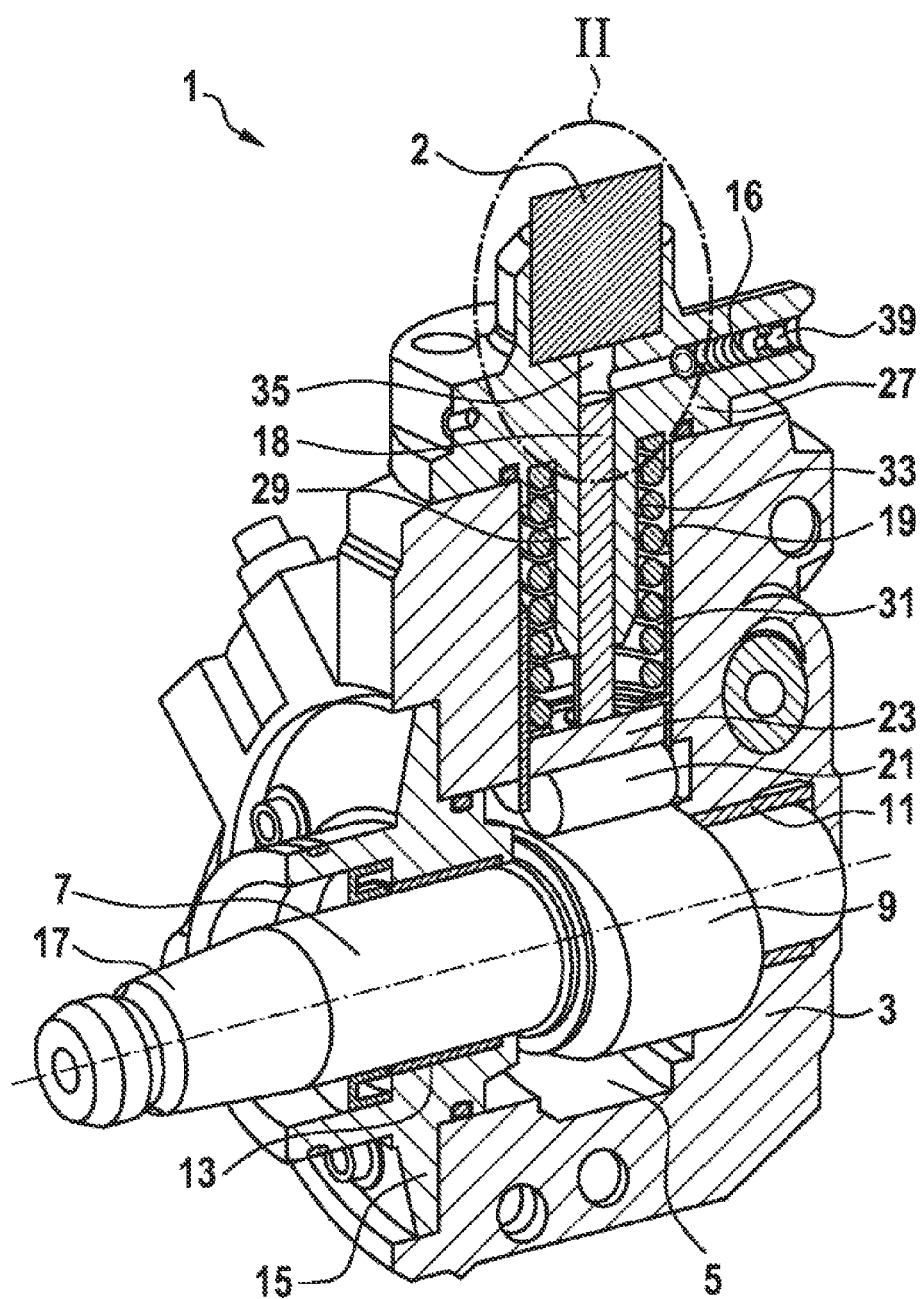
FIG. 1 shows a pump in a longitudinal section.

FIG. 1 shows a section through a schematically illustrated high-pressure pump 1, which is designed as a high-pressure fuel pump and is preferably installed in a common rail injection system. By means of the high-pressure pump 1, fuel supplied by a low-pressure fuel system, which has at least one tank, a filter and a low-pressure pump, is pumped into a high-pressure reservoir, from which the fuel stored there is removed by fuel injectors for injection into associated combustion chambers of a combustion engine. The fuel is transferred to a pump working space 35 by an electromagnetically controllable suction valve 2, wherein the electromagnetically controllable suction valve, which will be explained below, is installed on the high-pressure pump 1.

The high-pressure pump 1 has a pump housing 3 with a camshaft space 5. A camshaft 7 having a cam 9 designed as a double cam, for example, projects into the camshaft space 5. The camshaft 7 is supported in two bearings arranged on both sides of the cam 9 and designed as radial bearings, in the form of a housing bearing 11, which is arranged in the pump housing 3, and of a flange bearing 13, which is arranged in a flange 15 connected to the pump housing 3 and closes off the camshaft space 5 leaktightly with respect to the environment. The flange 15 has a through opening, through which a drive-side end portion 17 of the camshaft 7 projects. By way of example, the drive-side end portion 17 has a taper, on which a drive wheel is mounted and secured. The drive wheel is designed as a belt pulley or gearwheel, for example. The drive wheel is driven directly or indirectly by the combustion engine, e.g. via a belt drive or a gear mechanism.

A tappet guide 19 is furthermore recessed into the pump housing 3, into which guide a roller tappet 23 having a running roller 21 is inserted. The running roller 21 runs on the cam 9 of the camshaft 7 during a rotary motion of the latter, and the roller tappet 23 is thus moved up and down in translation in the tappet guide 19. At the same time, the roller tappet 23 interacts with a pump plunger 18, which is arranged in a cylinder bore 29 formed in a pump cylinder head 27 in a manner which likewise allows it to move up and down in translation.

Arranged in a tappet spring space 31 formed by the tappet guide 19 and the pump bore 29 is a tappet spring 33, which is supported at one end on the pump cylinder head 27 and at the other end on the roller tappet 23 and which ensures continuous contact between the running roller 21 and the cam 9 in the direction of the camshaft 7. The pump working space 35, into which fuel is introduced via the electromagnetically controllable suction valve 2, is formed in the pump cylinder head 27 as an extension of the pump plunger 18. The introduction of the fuel takes place during a downward movement of the pump plunger 18, while fuel present in the pump working space 35 is pumped into the high-pressure reservoir via a high-pressure outlet 39 containing an outlet valve 16 and via an onward-leading high-pressure line during an upward movement of the pump plunger 18. The high-pressure pump 1 is fuel-lubricated overall, wherein the fuel is pumped from the low-pressure system into the camshaft space 5, which is connected to the suction valve 2 in terms of flow. This electromagnetically controllable suction valve 2 and the functionality thereof are described below.

In the suction mode of the high-pressure pump 1, the electromagnetically controllable suction valve 2 is open and a connection between the pump working space 35 and a fuel feed 26 is established, with the result that fuel is fed to the pump working space 35 via the suction valve 2. In the delivery mode of the high-pressure pump 1, the fuel fed to the pump working space 35 is compressed and fed to a high-pressure reservoir (not shown) via the high-pressure valve 16 arranged in the high-pressure outlet 39. In the compression mode of the high-pressure pump 1, in which the pump plunger 18 moves upward, the suction valve 2 is closed when fuel delivery is supposed to take place, and it seals off the pump working space 35 from the fuel feed 26.

Figure 2:
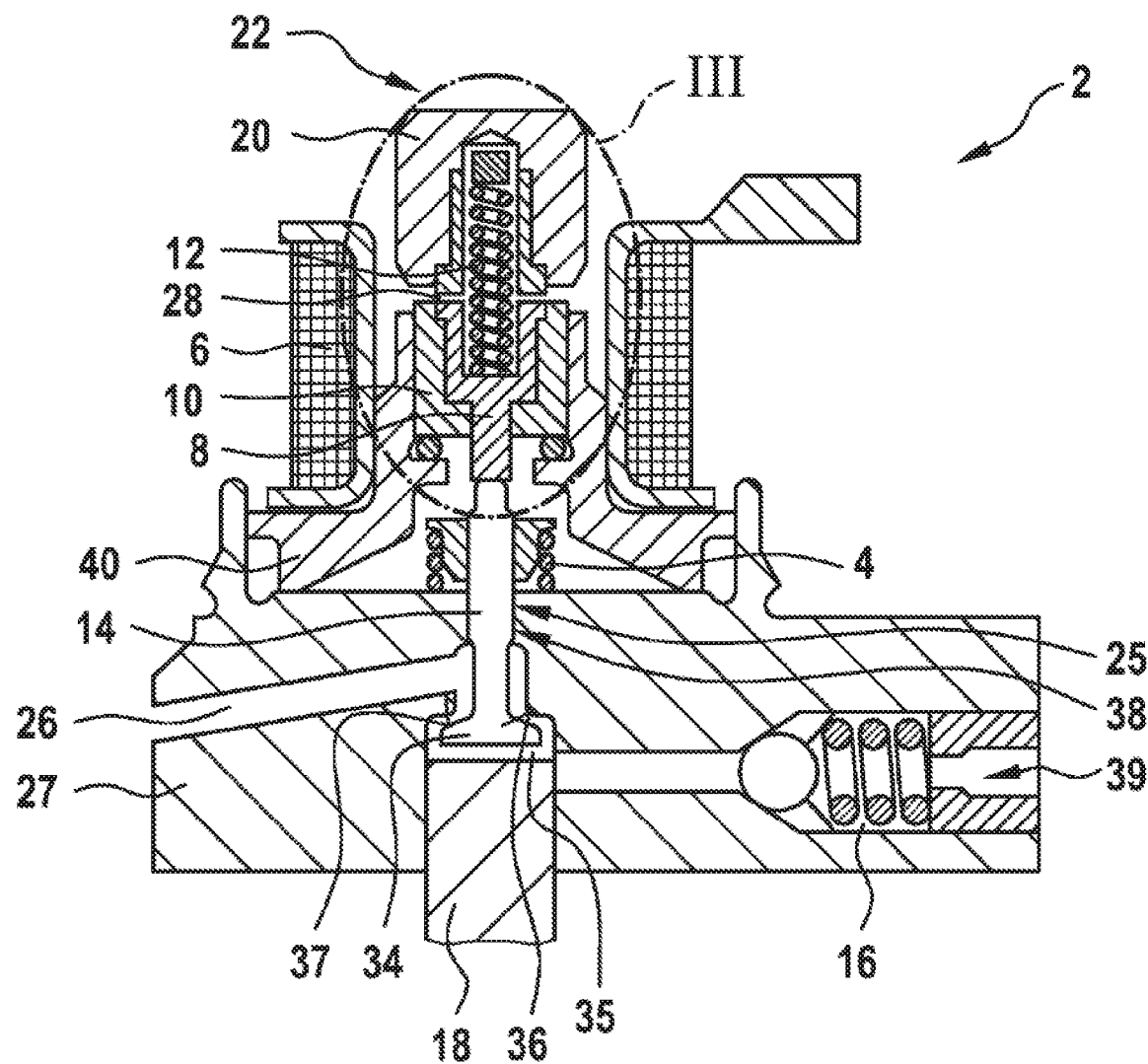
FIG. 2 shows a detail of the pump in an enlarged illustration with a suction valve, the detail being denoted by II in FIG. 1.

The elements of an electromagnetic actuator 22 are illustrated in FIG. 2. The electromagnetically controllable suction valve 2 attached to the high-pressure pump 1, which is illustrated in FIG. 2, has a plunger-shaped valve element 14, which is acted upon in the closing direction by a spring force of a first compression spring 4. Moreover, the pump cylinder head 27 has a valve seat 36 in the region of contact with a head 34 of the valve element 14. The plunger-shaped valve element 14 is guided by a stem 25 in a bore 38 in the pump cylinder head 27 and has the head 34, which has an enlarged diameter relative to the stem 25. A sealing surface 37 is formed on this enlarged head 34 of the valve element 14 and comes into contact with the valve seat 36 in the pump cylinder head 27 in the closed position of the valve element 14. The pump working space 35 is thereby separated from the fuel feed 26, and no fuel can flow back.

The valve element 14 is in contact with a magnet armature 10 via a magnet armature insert 8 as a further element, wherein the two elements are not connected to one another in the axial direction but are merely held in contact by magnetic forces and spring forces. A carrier element 40 is furthermore illustrated in FIG. 2.

A second compression spring 12 acts in an axial direction on the magnet armature 10 via the magnet armature insert 8. In the deenergized state of a magnet coil 6, the second compression spring 12 ensures that the magnet armature insert 8 acts on the valve element 14 and holds it in an open position. Although this is counteracted by the first compression spring 4, the second compression spring 12 has a higher spring force and therefore the valve element 14 is held in the open state. When the magnet armature 10 is energized by means of the magnet coil 6, the magnet armature 10 moves away from the valve element 14 against the force of the second compression spring 12 in order to close a working a gap 28, which is situated between the magnet armature 10 and a pole core 20. By moving away, the armature pin 8 loses nonpositive contact with the valve element 14, thereby allowing the valve element 14 to move in the direction of the closed state owing to the force of the first compression spring 4. In the completely closed state of the valve element 14, said valve element rests by means of the sealing surface 37 on the valve seat 36 and seals off the pump working space 35 with respect to the fuel feed 26.

A number of illustrative embodiments of the magnet armature 10 with the magnet armature insert 8 thereof and of the pole core 20 with the pole core insert 24 thereof are explained below with reference to FIGS. 3 to 7.

Figure 3:
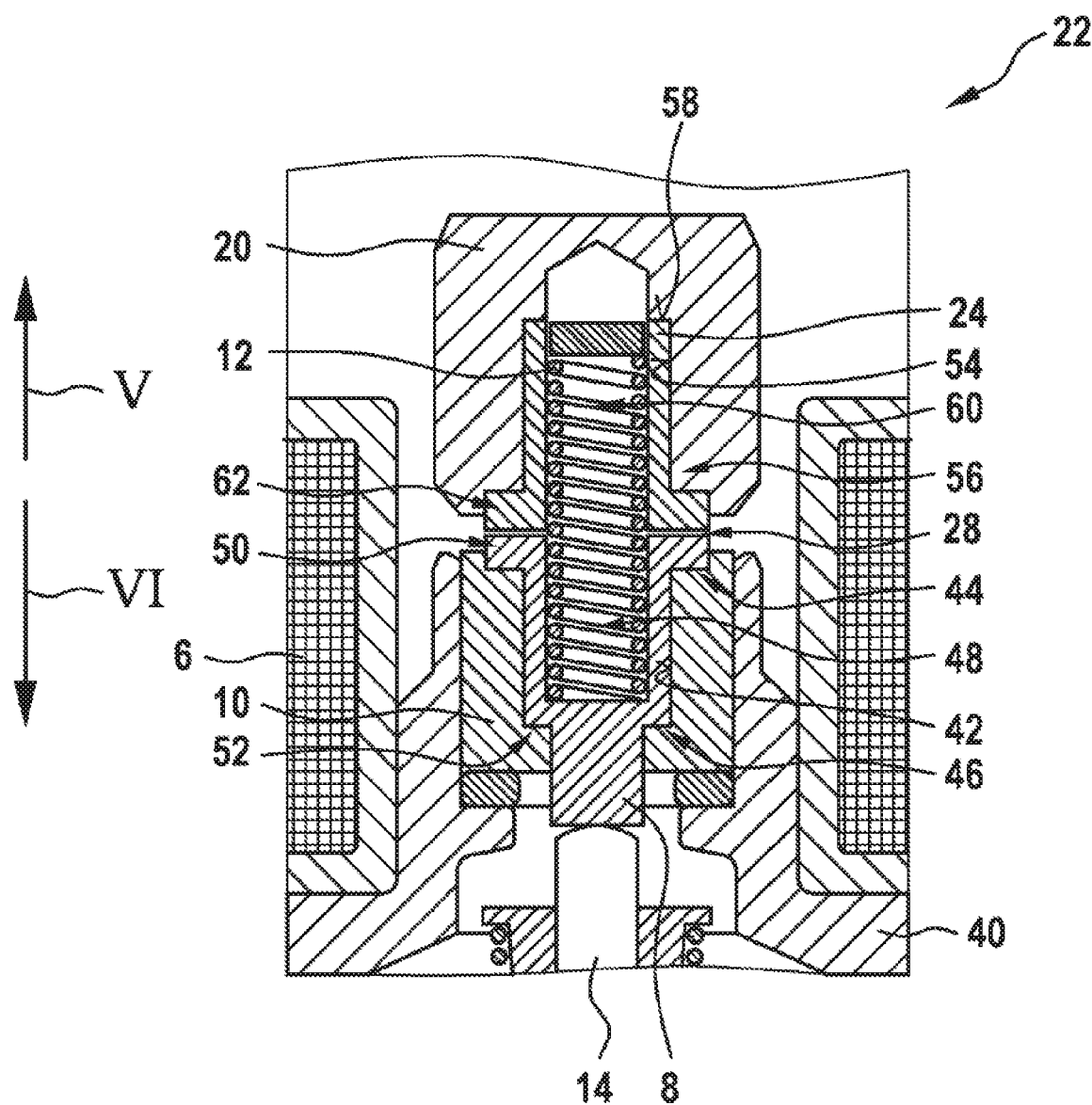
FIG. 3 shows a detail of the suction valve in accordance with a first illustrative embodiment in an enlarged illustration, the detail being denoted by III in FIG. 2.

A section through the magnet armature 10 in accordance with a first illustrative embodiment is illustrated in FIG. 3, wherein the magnet armature 10 has a first recess 42, wherein the first recess 42 has a stepped profile and forms a first shoulder 44 and a second shoulder 46. In this arrangement, the first shoulder 44 and the second shoulder 46 are situated in the region of the inner contour of the magnet armature 10, which is formed by the first recess 42. In this arrangement, the first shoulder 44 is situated on the side of the magnet armature 10 which faces the pole core 20. Furthermore, the second shoulder 46 is situated on the side of the magnet armature 10 which faces away from the pole core 20.

As a further element, the section through the magnet armature insert 8 in accordance with the first illustrative embodiment is illustrated, in which the magnet armature insert 8 has a second recess 48, a first collar 50 and a first offset 52.

Also shown is an insertion direction (VI), in which the magnet armature insert 8 is inserted into the magnet armature 10. The first collar 50 of the magnet armature insert 8 is situated on the side of the magnet armature insert 8 which faces away from the insertion direction (VI). The first offset 52 of the magnet armature insert is situated on the side of the magnet armature insert 8 which faces in the insertion direction (VI).

In particular, the magnet armature insert 8 is inserted here in such a way into the magnet armature in the insertion direction (VI) along the longitudinal axis that the first collar 50 comes into contact with the first shoulder 44 of the magnet armature 10 and the first offset 52 comes into contact with the second shoulder 46 of the magnet armature 10. Thus, the magnet armature insert is prevented from being inserted too far into the first recess 42 in the magnet armature 10.

FIG. 3 shows, inter alia, the following elements: pole core 20, pole core insert 24, magnet armature 10 and the magnet armature insert 8, in accordance with the first illustrative embodiment.

In particular, a section through the pole core 20 is illustrated, wherein the pole core 20 has a cylindrical outer contour and a third recess 54, wherein the third recess 54 has a profile with multiple steps and forms a third shoulder 56 and a fourth shoulder 58. In this arrangement, the third shoulder 56 and the fourth shoulder 58 are situated in the region of the inner contour of the pole core 20, which is formed by the third recess 54 and is thus situated within the pole core 20. In this arrangement, the third shoulder 56 is situated on the side of the pole core 20 which faces the magnet armature 10. Moreover, the fourth shoulder 58 is situated on the side of the pole core 20 which faces away from the magnet armature 10. Furthermore, a section through the pole core insert 24 in accordance with the first illustrative embodiment is illustrated, wherein the pole core insert 24 has a fourth recess 60 and a second collar 62.

Moreover, an insertion direction (V), in which the pole core insert 24 is inserted into the pole core 20, is illustrated. The second collar 62 of the pole core insert 24 is situated on the side of the pole core insert 24 which faces away from the insertion direction (V). In this case, the pole core insert 24 is thus inserted into the third recess 54 in the pole core 20 in the insertion direction (V) along the longitudinal axis and is supported by means of the second collar 62 on the third shoulder 56 of the pole core 20 in the direction of the longitudinal axis. By means of the second collar 62 of the pole core insert 24, which is supported on the third shoulder 56 of the pole core 20, the pole core insert 24 is prevented from being inserted deeply into the third recess 54 in the pole core 20.

The inserts 8, 24 are in direct contact with one another in the axial direction in the region of their respective collars 50, 62. This prevents the magnet armature 10 and the pole core 20 from coming into direct contact with one another. This is based on the fact that the magnet armature insert 8 and/or the pole core insert 24 are composed of a material which has a higher strength than the material of the magnet armature 10 and/or of the pole core 20. The material of the magnet armature 10 and/or the material of the pole core 20 are selected primarily because of their good magnetic properties. By means of this measure, damage to the components comprising magnet armature 10 and pole core 20 are largely avoided since the magnetic and mechanical forces are separated by the use of the inserts 8, 24.

Furthermore, the detail III illustrated in FIG. 3 shows in detail that the second compression spring 12 projects respectively into the second recess 48 in the magnet armature insert 8 and into the fourth recess 60 in the pole core insert 24. The magnet armature 10 is furthermore guided axially in the carrier element 40 in a manner which allows a stroke motion. In the radial direction, the magnet armature 10 is surrounded by the magnet coil 6, which, when energized, forms a magnetic field and can thus exert a magnetic force on the magnet armature 10.

The valve element 14 is in contact with the magnet armature 10 via the magnet armature insert 8, wherein the two elements are not connected to one another in the axial direction but are merely held in contact with one another by magnetic forces and spring forces.

However, it is also possible for the magnet armature insert 8 to be embodied in such a way that it projects from the magnet armature 10 only on the side facing the pole core 20 and thus projects only partially into the first recess. In this case, an armature pin can be inserted, e.g. pressed, into the magnet armature 10 from the side facing the valve element 14 so as to be in contact with the valve element 14. This pressed-in armature pin furthermore prevents direct contact being established between the valve element 14 and the magnet armature 10 since this could lead to damage to the relatively soft magnetic material of the magnet armature 10.

Figure 4:
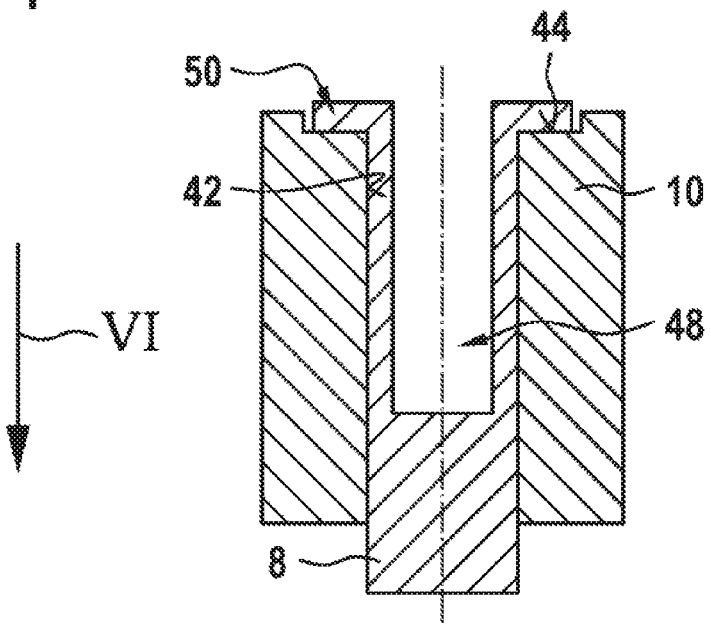
FIG. 4 shows a section through a magnet armature with a magnet armature insert in accordance with a second illustrative embodiment.

FIG. 4 shows the section through a second illustrative embodiment of the magnet armature insert 8 with the magnet armature 10. In the second illustrative embodiment, the magnet armature insert 8 is inserted into the first recess 42 in the magnet armature 10, with the result that the first collar 50 of the magnet armature insert 8 comes into contact with the first shoulder 50 of the magnet armature 10, and the magnet armature insert 8 is thus prevented from being inserted too far into the first recess 42 in the magnet armature 10. As a departure from the first illustrative embodiment, the first recess 42 in the magnet armature 10 in accordance with the second illustrative embodiment is designed with only a single step and has only the first shoulder 44 but not the second shoulder 46. The magnet armature 10 is designed to be open toward the valve element 14, and the magnet armature insert 8 is in contact with the valve element 14. Part of the magnet armature insert can project from the magnet armature 10 on the side facing the valve element 14 so as to be in contact with the valve element 14. As an alternative, it is also possible for the valve element 14 to project into the magnet armature 10 and to be in contact with the magnet armature insert 8, with the result that the magnet armature insert 8 does not project from the magnet armature 10.

Figure 5:
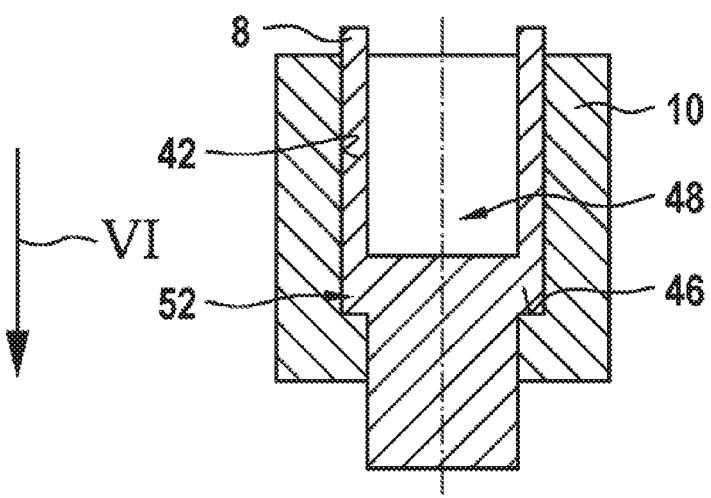
FIG. 5 shows a section through the magnet armature with the magnet armature insert in accordance with a third illustrative embodiment.

The section through a third illustrative embodiment of the magnet armature insert 8 with the magnet armature 10 is illustrated in FIG. 5. In the third illustrative embodiment, the magnet armature insert 8 is inserted into the first recess 42 in the magnet armature 10, with the result that the first offset 52 of the magnet armature insert 8 comes into contact with the second shoulder 46 of the magnet armature 10, and the magnet armature insert 8 is thus prevented from being inserted too far into the first recess 42 in the magnet armature 10. The magnet armature 10 is designed to be open toward the valve element 14, and the magnet armature insert 8 is in contact with the valve element 14. Part of the magnet armature insert can project from the magnet armature 10 on the side facing the valve element 14 so as to be in contact with the valve element 14.

As a departure from the third illustrative embodiment, the first recess 42 in the magnet armature 10 in accordance with the third illustrative embodiment is designed with only a single step and has only the second shoulder 46 but not the first shoulder 44. In the third illustrative embodiment, the first collar 50 can be omitted from the magnet armature insert 8.

Figure 6:
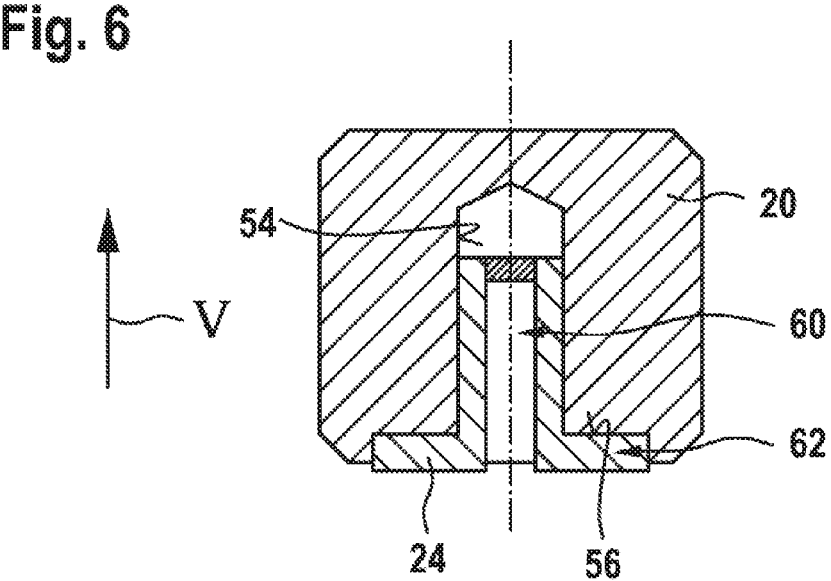
FIG. 6 shows a section through a pole core with a pole core insert in accordance with a fourth illustrative embodiment.

The section illustrated in FIG. 6 shows a fourth illustrative embodiment of the pole core insert 24 with the pole core 20. In the fourth illustrative embodiment, the pole core insert 24 is inserted into the third recess 54 in the pole core 20 in such a way that the second collar 62 of the pole core insert 24 comes into contact with the third shoulder 56 of the pole core 20, and thus the pole core insert 24 is prevented from being inserted too far into the third recess 54 in the pole core 20. As a departure from the fourth illustrative embodiment, the third recess 54 of the pole core 20 in the fourth illustrative embodiment is designed with only a single step and has only the third shoulder 56 but not the fourth shoulder 58.

Figure 7:
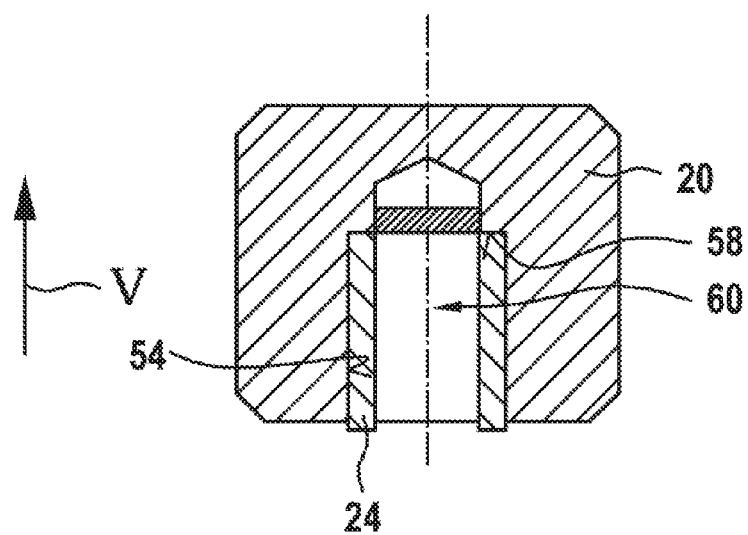
FIG. 7 shows a section through the pole core with the pole core insert in accordance with a fifth illustrative embodiment.

The section through a fifth illustrative embodiment of the pole core insert 24 with the pole core 20 is illustrated in FIG. 7. In the fifth illustrative embodiment, the pole core insert 24 is inserted into the third recess 54 in the pole core 20, with the result that the pole core insert 24 comes into contact with the fourth shoulder 58 of the pole core 20, and the pole core insert 24 is thus prevented from being inserted too far into the third recess 54 in the pole core 20. As a departure from the first illustrative embodiment, the third recess 54 in the pole core 20 in the fifth illustrative embodiment is designed with only a single step and has only the fourth shoulder 58 but not the third shoulder 56. The second collar 62 provided on the pole core insert 24 in the first illustrative embodiment can be omitted from the pole core insert 24 in accordance with the fifth illustrative embodiment.

The above-explained illustrative embodiments of the magnet armature 10 with the magnet armature insert 8 thereof and the pole core 20 with the pole core insert 24 thereof can be combined with one another in any desired manner.

The invention claimed is:

1. A valve for a high-pressure pump (1) of a fuel injection system, the valve comprising a magnetic actuator (22), which has a magnet coil (6), a magnet armature (10) configured to perform a stroke motion, and a pole core (20), wherein the magnet armature (10) and the pole core (20) together delimit a working air gap (28), and the magnet armature (10) is configured to come into contact at least indirectly with the pole core (20), wherein the valve also comprises a valve element (14) which is configured to be moved between an open position and a closed position, and which is at least indirectly in mechanical contact with the magnet armature (10), characterized in that at least one of a separate magnet armature insert (8) arranged in the magnet armature (10) and a separate pole core insert (24) arranged in the pole core (20) is provided in a region of contact of the magnet armature (10) with the pole core (20), such that the magnet armature (10) comes into contact with the pole core (20) via the at least one of a separate magnet armature insert (8) arranged in the magnet armature (10) and a separate pole core insert (24) arranged in the pole core (20).

2. A pump comprising a valve as claimed in claim 1.

3. The valve as claimed in claim 1 wherein the valve comprises the separate magnet armature insert (8) arranged in the magnet armature (10) in the region of contact of the magnet armature (10) with the pole core (20).

4. The valve as claimed in claim 3, characterized in that the magnet armature insert (8) is introduced into a first recess (42) in the magnet armature (10), said recess facing the pole core (20).

5. The valve as claimed in claim 4, characterized in that the magnet armature insert (8) is configured in such a way that the magnet armature insert (8) projects from the first recess (42) in the magnet armature (10) on a side facing the pole core (20), and is in contact with the valve element (14) on a side of the magnet armature (10) which faces away from the pole core (20).

6. The valve as claimed in claim 4, characterized in that the magnet armature insert (8) is configured in such a way that the magnet armature insert (8) projects from the first recess (42) in the magnet armature (10) on a side facing the pole core (20), and is in contact with the valve element (14) on a side of the magnet armature (10) which faces away from the pole core (20), and projects beyond a surface of the magnet armature (10) on a side facing the valve element (14).

7. The valve as claimed in claim 3, characterized in that the magnet armature insert (8) has a first collar (50) on a side facing the pole core (20), said collar projecting in an axial direction from a surface of the magnet armature (10) which faces the pole core (20) and/or said collar having a first enlarged outside diameter in comparison with an outside diameter of the magnet armature insert (8) in a remaining region thereof.

8. The valve as claimed in claim 7, characterized in that the first collar (50) of the magnet armature insert (8) is supported in an axial direction on a first shoulder (44) of the magnet armature (10), said shoulder being formed circumferentially on an inside diameter of the magnet armature (10).

9. The valve as claimed in claim 3, characterized in that the magnet armature insert (8) is composed of a material which has a higher strength than the material of the magnet armature (10).

10. The valve as claimed in claim 3, characterized in that a material of the magnet armature insert (8) is nonmagnetic.

11. The valve as claimed in claim 3, characterized in that a second compression spring (12) projects into a second recess (48) in the magnet armature insert (8), wherein the second compression spring (12) is arranged between the magnet armature (10) and the pole core (20) and the second compression spring (12) exerts an axial and mutually opposed force on the magnet armature (10) and the pole core (20).

12. The valve as claimed in claim 3, characterized in that a second compression spring (12) projects into a second recess (48) in the magnet armature insert (8) and is guided in the radial and/or axial direction, wherein the second compression spring (12) is arranged between the magnet armature (10) and the pole core (20) and the second compression spring (12) exerts an axial and mutually opposed force on the magnet armature (10) and the pole core (20).

13. The valve as claimed in claim 1 wherein the valve comprises the separate pole core insert (24) arranged in the pole core (20) in the region of contact of the magnet armature (10) with the pole core (20).

14. The valve as claimed in claim 13, characterized in that the pole core insert (24) has a second collar (62) on a side facing the magnet armature (10), said second collar projecting in an axial direction from a surface of the pole core (20) which faces the magnet armature (10) and/or said second collar having a second enlarged outside diameter in comparison with an outside diameter of the pole core insert (24) in a remaining region thereof.

15. The valve as claimed in claim 14, characterized in that the second collar (62) of the pole core insert (24) is supported in an axial direction on a third shoulder (56) of the pole core (20), said shoulder being formed circumferentially on the inside diameter of the pole core (20).

16. The valve as claimed in claim 13, characterized in that the pole core insert (24) is introduced into a third recess (54) in the pole core (20), said recess facing the magnet armature (10).

17. The valve as claimed in claim 13, characterized in that the pole core insert (24) is composed of a material which has a higher strength than a material of the pole core (20).

18. The valve as claimed in claim 13, characterized in that a material of the pole core insert (24) is nonmagnetic.

19. The valve as claimed in claim 13, characterized in that a second compression spring (12) projects into a fourth recess (60) in the pole core insert (24), wherein the second compression spring (12) is arranged between the magnet armature (10) and the pole core (20) and the second compression spring (12) exerts an axial and mutually opposed force on the magnet armature (10) and the pole core (20).

20. The valve as claimed in claim 13, characterized in that a second compression spring (12) projects into a fourth recess (60) in the pole core insert (24) and is guided in the radial and/or axial direction, wherein the second compression spring (12) is arranged between the magnet armature (10) and the pole core (20) and the second compression spring (12) exerts an axial and mutually opposed force on the magnet armature (10) and the pole core (20).

21. A valve for a high-pressure pump (1) of a fuel injection system, the valve comprising a magnetic actuator (22), which has a magnet coil (6), a magnet armature (10) configured to perform a stroke motion, and a pole core (20), wherein the magnet armature (10) and the pole core (20) together delimit a working air gap (28), and the magnet armature (10) is configured to come into contact at least indirectly with the pole core (20), wherein the valve also comprises a valve element (14) which is configured to be moved between an open position and a closed position, and which is at least indirectly in mechanical contact with the magnet armature (10), characterized in that a separate magnet armature insert (8) arranged in the magnet armature (10) is provided in a region of contact of the magnet armature (10) with the pole core (20), such that the magnet armature (10) comes into contact with the pole core (20) via the separate magnet armature insert (8), wherein the magnet armature insert (8) is introduced into a first recess (42) in the magnet armature (10), said recess facing the pole core (20), and wherein the magnet armature insert (8) is configured in such a way that the magnet armature insert (8) projects from the first recess (42) in the magnet armature (10) on a side facing the pole core (20), and is in contact with the valve element (14) on a side of the magnet armature (10) which faces away from the pole core (20), and projects beyond a surface of the magnet armature (10) on a side facing the valve element (14).

22. A valve for a high-pressure pump (1) of a fuel injection system, the valve comprising a magnetic actuator (22), which has a magnet coil (6), a magnet armature (10) configured to perform a stroke motion, and a pole core (20), wherein the magnet armature (10) and the pole core (20) together delimit a working air gap (28), and the magnet armature (10) is configured to come into contact at least indirectly with the pole core (20), wherein the valve also comprises a valve element (14) which is configured to be moved between an open position and a closed position, and which is at least indirectly in mechanical contact with the magnet armature (10), characterized in that a separate magnet armature insert (8) arranged in the magnet armature (10) and a separate pole core insert (24) arranged in the pole core (20) are provided in a region of contact of the magnet armature (10) with the pole core (20), such that the magnet armature (10) comes into contact with the pole core (20) via the separate magnet armature insert (8) arranged in the magnet armature (10) and the separate pole core insert (24) arranged in the pole core (20).

* * * * *